United States Patent [19]
Saporito et al.

[11] 3,937,936
[45] Feb. 10, 1976

[54] EQUIPMENT SELF-REPAIR BY ADAPTIVE MULTIFUNCTION MODULES

[75] Inventors: James Saporito, Stamford, Conn.; Wolfgang W. Gaertner, Utica, N.Y.

[73] Assignee: The United States of America as represented by the Secretary of the Air Force, Washington, D.C.

[22] Filed: Apr. 14, 1975

[21] Appl. No.: 567,893

[52] U.S. Cl............................ 235/153 AE; 307/204
[51] Int. Cl.²................... G06F 15/16; H03K 19/00; H03K 17/60
[58] Field of Search....... 235/153 AE; 307/204, 207

[56] References Cited
UNITED STATES PATENTS 3,576,984   5/1971   Gregg ............................ 307/207 X
3,881,670   5/1975   Doniger ..................... 235/153 AE X Primary Examiner—R. Stephen Dildine, Jr.
Attorney, Agent, or Firm—Joseph E. Rusz; William Stepanishen

[57] ABSTRACT

An equipment self repair apparatus utilizing the substitution of redundant circuits for a failure in any original operating logic module. The substitution is accomplished through the use of a multiplexer unit which disconnects the faulty circuit and switches a built-in spare in its place.

7 Claims, 4 Drawing Figures

EQUIPMENT SELF-REPAIR BY ADAPTIVE MULTIFUNCTION MODULES

STATEMEMT OF GOVERNMENT INTEREST

The invention described herein may be manufactured and used by or for the Government for governmental purposes without payment of any royalty thereon.

BACKGROUND OF THE INVENTION

The present invention relates broadly to equipment self-repair devices and in particular to an equipment self-repair apparatus utilizing adaptive multifunction modules to replace faulty logic modules.

In the prior art, circuit reliability is increased through the use of redundant circuits. These redundant circuits are introduced, in the event of a failure, through the use of logic circuits such as an OR or a NOR gate. One of the prior art repair methods involves the use of redundant binary logic circuits which are formed with NOR-gates (or alternatively, NAND-gates) fed from replicate inputs, so that a comparatively high degree of reliability may be achieved by redundancies introduced in a compartively economical way. Each simple NOR function with k inputs is performed by r gates each having k times r inputs. Such systems of NOR gates tend to correct spurious zero signals, and the redundant components are arranged to make spurious one signals highly improbable. Corresponding systems of NAND-gates tend to correct spurious one signals and in these cases the redundancies must be arranged to make spurious zero signals improbable.

Another example of prior art techniques, is the use of parallel redundancy wherein mutually identical circuits or circuit elements are connected in paralled so that the operation is performed simultaneously by the parallel circuits or elements thereby producing identical outputs when all elements are functioning properly. If one circuit or element should cease to operate, the other or others will continue to operate and thus prevent interruption of the mission. However, these prior art techniques greatly increase the number of circuits in a system since one or more circuits are utilized to insure the operation of a particular function. The present invention utilizes an adaptive spare which may be utilized to provide any number of different functions thus reducing the spares requirement and increasing reliability.

SUMMARY OF THE INVENTION

The present invention utilizes adaptive spares to replace an original module if a failure occurs. The original module is disconnected from the signal path and power supply by a multiplexer and a built-in spare is switched into its place. The spare circuit is adaptable to any number of different functions, so that only one spare is required for every four to ten original logic modules. The present apparatus increases the overall equipment complexity by not more than 20 to 50 percent and provides reliability equivalent to three or more parallel systems of conventional stand-by redundancy.

It is one object of the invention, therefore, to provide an improved equipment self-repair apparatus utilizing adaptable spares to provide a number of different functions.

It is another object of the invention to provide an improved equipment self-repair apparatus utilizing a multiplexer unit to disconnect a faulty original module and to connect a spare in its place.

It is still another object of the invention to provide an improved equipment self-repair apparatus which does not substantially increase circuit complexity and provides a higher degree of circuit reliability.

These and other advantages, features and objects of the invention will become more apparent from the following description when taken in connection with the illustrative embodiment in the accompanying drawings.

DESCRIPTION OF THE PREFERRED EMBODIMENT

Figure 1:
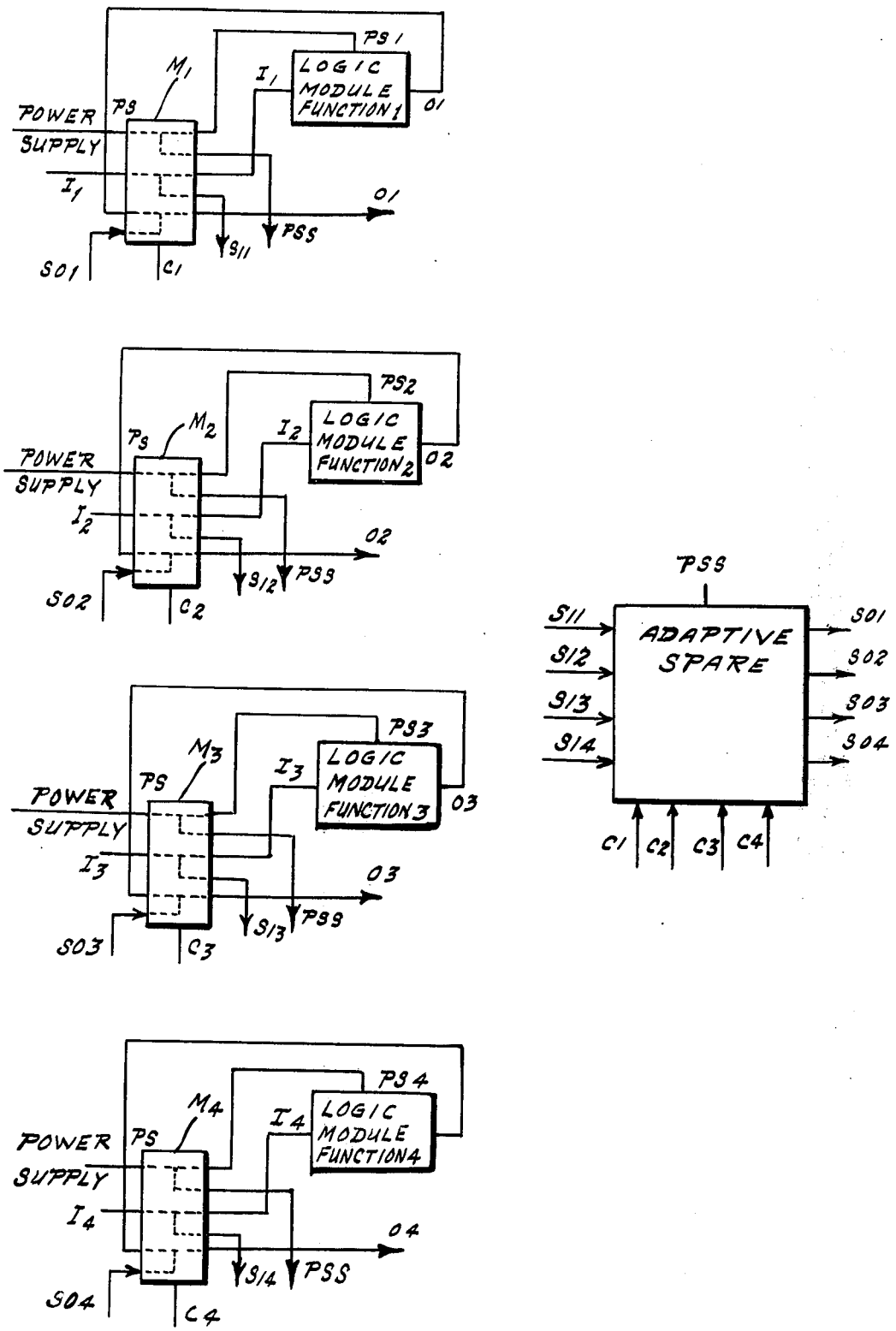
FIG. 1 is a block diagram of a typical self-repair apparatus providing one adaptive spare for four original logic modules.

Referring now to FIG. 1, there is shown an equipment self-repair apparatus utilizing one adaptive spare module for four original logic units. If a failure occurs in any original operating logic module, it is disconnected from the signal path and power supply by a multiplexer, and a built-in spare is switched in its place. The spare circuitry is adaptable to any number of different functions, so that only one spare is required for every four to ten original logic modules. FIG. 1 provides a specific example of one spare covering four (different) original logic modules. The number of input signals leads to the four logic modules is N11 through N14, the number r of output signals leads is N01 through N04. The power supply connection is labelled PS. The four multiplexers, M1 through M4, determine the entire operation of the self-repairable group of modules. As long as the multiplexer control signals, C1 through C4, are all at logical 1, the supply voltage and the system input and output signals are all connected to the original operating logic modules. If a fault is detected in a given module, the control signal to the associated multiplexer is set to logical 0. This causes the supply voltage to be disconnected from the original logic module and applied to the spare; the input and output leads are disconnected from the original logic module and connected to the spare; and the spare is adapted to exactly the function of the replaced logic module.

The design of the multiplexers and of the logic circuits is such that a single failure in a multiplexer component does not make the module group inoperative, The resultant reliability for an overall system consisting of many such module groups in series is equal to that of three or even more parallel systems in standby redundancy.

Figure 2:
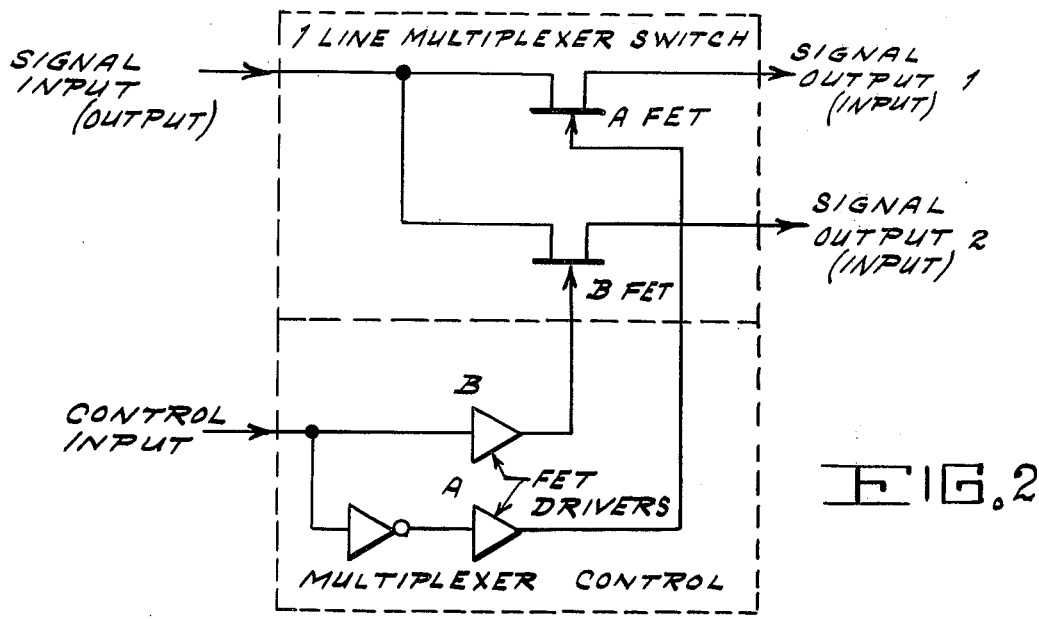
FIG. 2 is a schematic diagram of a FET multiplexer switch providing M1X2 operation, FIG. 3 A is a schematic diagram of dual FET switch and driver redundancy.

Turning now to FIG. 2, there is shown a single type of field-effect transistor (FET) multiplexer that implements the functions of the M1X2 and M2X1 multiplexers. In this design field-effect transistors are used to control signal routing. Each signal line has one associated FET, the multiplexer has an associated inverter and a pair of FET drivers to control signal routing. This system has a number of advantages and a single minor disadvantage. The first obvious advantage is that only two FETs are required per signal line. In contrast to the active logic's 30 components per signal line. Although each FET driver has 12 components (three transistors and nine resistors and diodes) and there are two drivers per multiplexer in addition to an inverter, the overall complexity is materially less than that for active logic.

For example, an M10X5 multiplexer would require 10 FETs and 34 components in the driver for a total of 44 components. This is 116 fewer than that required for active-logic implementation. Therefore, the reliability of FET multiplexers is considerably higher than that of a functionally equivalent active logic multiplexer, and its size is considerably smaller.

The second major advantage is that there is no propagation delay introduced by the FET. This absence of propagation delays means that the overall equipment speed and the timing relationships within the original operating circuitry are not affected by the introduction of FET multiplexers. Therefore, no major redesign of equipment is required when retrofitting equipment for self-test or self-repair. With regard to multiplexer power consumption only the multiplexer control circuitry consumes power. Typically, 12 milliwatts are consumed per FET driver and 23 mW for the inverter. Therefore, the entire multiplexer consumes 47 milliwatts - this is 206 milliwatts less than that consumed by the M10X5 active logic multiplexer described previously.

The use of symmetrical field-effect transistor switches halves the number of multiplexer types required since each multiplexer can be used in two directions. This feature is shown in FIG. 2 by the input and output designations which are included in parentheses for the latter case. The multiplexer functions in a M1X2 configuration with signals flowing from left to right or in a M2X1 configuration with signals flowing from right to left. The only disadvantage of the FET multiplexer is the introduction of an offset voltage between input and output signal lines. The value of this offset voltage is a function of the signal current and the FET channel width. Channel width can be made suitably large to reduce the offset voltage so that no appreciable reduction in logic circuitry noise immunity is introduced or analog circuit operation is not degraded. However, one must consider the effect of junction capacitance increases as the channel is widened. This capacitance loads the signal line, introducing current spikes during switching. Although not a serious problem, minimization of such current spikes is desirable and a trade-off should be made to optimize the relationship between offset voltage and capacitance.

In analog applications, the FETs must also have good stability and linearity of its offset voltage to prevent offset erros. Some FET switches are available that avoid the problem of zero offset. These switches have linear resistance characteristics as the V-1 characteristics approach zero to eliminate the offset error. The use of such FETs in analog applications would minimize offset problems.

The FET multiplexer is serially connected in the signal lines of operating circuitry and performs input and output switching functions. Of these switching operations, the most critical is the ability to disconnect the faulty operating circuitry so that the spare circuitry can be switched in to replace it. It may be seen in FIG. 2 that the failure of the A FET to cut off would mean that the defective operating circuitry would be connected in parallel with the switched-in spare circuitry. Such a failure would result in a non-repairable condition.

Figure 3A:
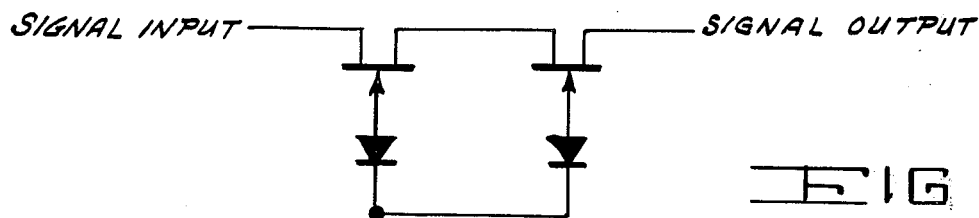
FIG. 3 B is a schematic diagram of dual FET switch and driver redundancy.
Figure 3B:
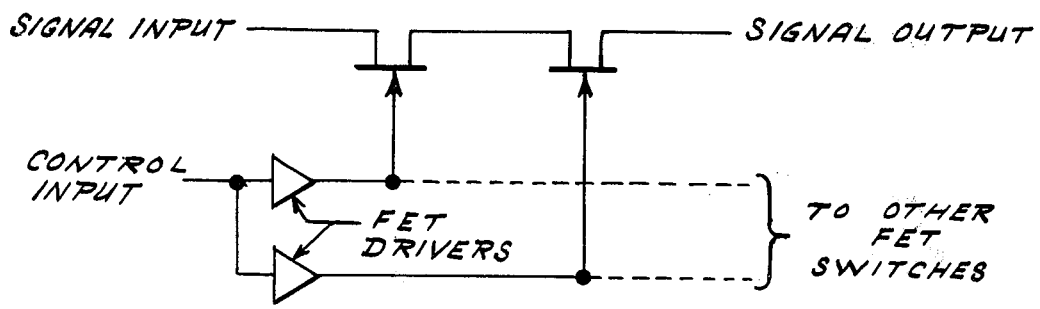

In order to eliminate the above problem and to increase the reliability of switching out the operating circuitry using redundancy techniques, two methods are presented. The first method which is shown in FIG. 3A illustrates the use of two seraially-connected FETs. Failure of either FET to cut off does not impair operation since the other FET can perform the switching operation. Two diodes are required to isolate the FETs and make the circuit fail safe. The method shown in FIG. 3B illustrates a method of FET switch and driver redundancy to improve reliability. In this configuration, two independent FET/driver combinations are used to provide switching redundancy. In both examples, only one signal line and driver are shown. Other FETs are driven from the same FET driver as described previously. The FET multiplexer switch offers a highly reliable switching device with low power consumption that introduces no propagation delay. The FET multiplexers may be fabricated in integrated-circuit form.

Although the invention has been described with reference to a particular embodiment, it will be understood to those skilled in the art that the invention is capable of a variety of alternative embodiments within the spirit and scope of the appended claims.

What is claimed is:

1. An equipment self-repair apparatus utilizing adaptive multifunction modules comprising in combination:
   a plurality of logic units having an input, an output, and power supply respectively,
   a plurality of multiplexer units respectively connected to said plurality of logic units, said plurality of multiplexer units respectively controlling the input and the power supply connections to said plurality of logic units, said plurality of multiplexer units respectively controlling the output from said plurality of logic units, said plurality of multiplexer units respectively providing a control signal, and
   an adaptive spare unit connected respectively to each of said plurality of multiplexer units to receive said input and control signals therefrom, said adaptive spare unit providing a plurality of output signals respectively to said plurality of multiplexer units, said adaptive spare unit being substituted for one of said plurality of logic units when said respective multiplexer unit control signal indicates a faulty logic unit, said adaptive spare unit receiving the input from said faulty logic unit and providing an output to the multiplexer associated with said faulty logic unit.

2. An equipment self-repair apparatus as described in claim 1 wherein said plurality of logic units and multiplexer units is greater than three.

3. An equipment self-repair apparatus as described in claim 1 wherein said plurality of multiplexer units respectively comprise in combination:
   a multiplexer switch to switch said input and output and
   a multiplexer control unit to control said multiplexer switch.

4. An equipment self-repair apparatus as described in claim 3 wherein said multiplexer switches comprise dual FET switches in series.

5. An equipment self-repair apparatus as described in claim 3 wherein said multiplexer switches comprise dual FET switches in parallel.

6. An equipment self-repair apparatus as described in claim 4 wherein said multiplexer control unit comprises a plurality of FET driver units in series.

7. An equipment self-repair apparatus as described in claim 5 wherein said multiplexer control unit comprises a plurality of FET driver units in parallel.

* * * * *